United States Patent
Takahashi

(10) Patent No.: US 11,470,232 B2
(45) Date of Patent: Oct. 11, 2022

(54) APPEARANCE INSPECTION APPARATUS FOR TERMINAL

(71) Applicants: Yazaki Corporation, Tokyo (JP); JAPAN CHAIN TERMINAL CO., LTD., Tendo (JP)

(72) Inventor: Yuji Takahashi, Tendo (JP)

(73) Assignees: YAZAKI CORPORATION, Tokyo (JP); JAPAN CHAIN TERMINAL CO., LTD., Tendo (JP)

( * ) Notice: Subject to any disclaimer, the term of this patent is extended or adjusted under 35 U.S.C. 154(b) by 0 days.

(21) Appl. No.: 16/912,938

(22) Filed: Jun. 26, 2020

(65) Prior Publication Data

US 2020/0412924 A1 Dec. 31, 2020

(30) Foreign Application Priority Data

Jun. 28, 2019 (JP) .............................. JP2019-122298

(51) Int. Cl.
| | |
|---|---|
| *H04N 5/225* | (2006.01) |
| *H04N 5/232* | (2006.01) |
| *H04N 7/18* | (2006.01) |
| *G02B 7/182* | (2021.01) |

(52) U.S. Cl.
CPC ......... *H04N 5/2259* (2013.01); *G02B 7/1821* (2013.01); *H04N 5/232* (2013.01); *H04N 7/18* (2013.01)

(58) Field of Classification Search
CPC ........ H04N 5/2259; H04N 5/232; H04N 7/18; G02B 7/1821

USPC .......................................................... 348/92
See application file for complete search history.

(56) References Cited

U.S. PATENT DOCUMENTS

| | | | | | |
|---|---|---|---|---|---|
| 5,414,925 | A | * | 5/1995 | Nishide | H01R 43/20 29/748 |
| 2010/0221029 | A1 | * | 9/2010 | Minbu | G03G 15/0131 399/66 |
| 2019/0306427 | A1 | * | 10/2019 | Matsuka | G02B 7/1821 |

FOREIGN PATENT DOCUMENTS

| | | | | |
|---|---|---|---|---|
| JP | 2011-107024 | A | | 6/2011 |
| JP | 2011107024 | A | * | 6/2011 |
| JP | 2013-232342 | A | | 11/2013 |
| JP | 2013232342 | A | * | 11/2013 |
| JP | 2016-148598 | A | | 8/2016 |
| JP | 2016148598 | A | * | 8/2016 |

* cited by examiner

*Primary Examiner* — John W Miller
*Assistant Examiner* — Omer Khalid
(74) *Attorney, Agent, or Firm* — Sughrue Mion, PLLC

(57) ABSTRACT

An optical image transmission unit that is provided in the rotating body so as to rotate integrally with the rotating body, that is provided such that a light entering end faces an outer peripheral surface of the terminal supported on the terminal supporting unit and a light emitting end is provided on the light receiving axis of the camera, and that is configured to emit an optical image of the outer peripheral surface of the terminal having entered the light entering end from the light emitting end toward the camera.

5 Claims, 7 Drawing Sheets

APPEARANCE INSPECTION APPARATUS FOR TERMINAL

CROSS REFERENCE TO RELATED APPLICATIONS

This application is based on and claims priority from Japanese patent application No. 2019-122298 filed on Jun. 28, 2019, the entire contents of which are incorporated herein by reference.

BACKGROUND OF THE INVENTION

1. Technical Field

The present invention relates to an appearance inspection apparatus for a terminal. The appearance inspection apparatus is configured to inspect an appearance of a part (a crimped part or the like) to be inspected of the terminal that is crimped to an end of an electric wire by imaging the part to be inspected with a camera.

2. Background Art

When a terminal-attached electric wire obtained by crimping a terminal to an end of an electric wire is manufactured, an insulation coating of the end of the electric wire is peeled off by an appropriate length to expose a core wire. An exposed part of the core wire is set at a conductor crimped part at rear of the terminal, and the conductor crimped part is crimped. A coated crimped part at the rear of the terminal is crimped to a part having the insulation coating. Accordingly, the terminal-attached electric wire is manufactured.

If there is a defect in the crimped part of this type of terminal-attached electric wire or a periphery thereof, the terminal-attached electric wire cannot be used as a product. Therefore, in manufacturing processing, an appearance inspection of the crimped part is performed to eliminate a defective product. When the appearance inspection is performed automatically, the crimp part of the terminal is imaged by the camera, and the imaged image is compared with an image of a non-defective product prepared in advance to determine quality. In this case, depending on a product number of the terminal, it may not be possible to determine the quality properly only by imaging the crimp part from one direction. Therefore, the crimp part is imaged at a plurality of angular positions in a circumferential direction of the terminal.

For example, Patent Literature 1 discloses an appearance inspection apparatus in which a plurality of cameras are provided around a central axis of a terminal, and the cameras are rotated around the central axis of the terminal to simultaneously image the terminal at a plurality of positions with the cameras.

CITATION LIST

Patent Literature

[Patent Document 1] JP-A-2011-107024

SUMMARY

Technical Problem

However, in the appearance inspection apparatus described in Patent Literature 1, the plurality of cameras are provided and the respective cameras are rotated, so that a structure becomes complicated and cost increases. A rotation range of the cameras is restricted due to a relationship of a camera wiring cable or the like. If the number of cameras is increased so as to compensate for the restriction, the structure may become further complicated and the cost increases.

The present invention has been made in view of the above-described circumstances. An aspect of the present invention provides an appearance inspection apparatus for a terminal that is capable of imaging an outer peripheral surface of a terminal from any angle in a circumferential direction with one camera without rotating the camera, thereby simplifying a structure and reducing cost.

Solution to Problem

In order to achieve the above-described aspect, an appearance inspection apparatus for a terminal according to the present invention is characterized by the following (1) to (5).

(1) An appearance inspection apparatus for a terminal crimped to an end of an electric wire, the appearance inspection apparatus comprising:
  a rotating body configured to rotate about a rotation axis;
  a terminal supporting unit configured to support the terminal inserted into the rotating body in a non-rotational state in which an entire outer periphery of a part to be inspected is opened and in a state in which a central axis of the terminal is aligned with the rotation axis;
  a camera provided in a state in which a light receiving axis is aligned with the rotation axis; and
  an optical image transmission unit that is provided in the rotating body so as to rotate integrally with the rotating body, that is provided such that a light entering end faces an outer peripheral surface of the terminal supported on the terminal supporting unit and a light emitting end is provided on the light receiving axis of the camera, and that is configured to emit an optical image of the outer peripheral surface of the terminal having entered the light entering end from the light emitting end toward the camera.

(2) The appearance inspection apparatus for a terminal according to (1),
  wherein the optical image transmission unit includes:
  a light entering mirror provided at the light entering end;
  a light emitting mirror provided at the light emitting end; and
  one or more intermediate mirrors configured to transmit an optical image of the outer peripheral surface of the terminal that has entered the light entering mirror and has been reflected by the light entering mirror to the light emitting mirror by reflection, and to emit the optical image from the light emitting mirror toward the camera.

(3) The appearance inspection apparatus for a terminal according to (2),
  wherein the rotating body includes a pair of side plates including inner side surfaces in parallel with the rotation axis and optical element supporting grooves on each inner side surface, and
  wherein the light entering mirror, the light emitting mirror, and the intermediate mirror are sandwiched between the pair of side plates by fitting both side edges of each of the light entering mirror, the light emitting mirror, and the intermediate mirror into the optical element supporting grooves of the inner side surfaces of the pair of side plates.

(4) The appearance inspection apparatus for a terminal according to (1), the appearance inspection apparatus further comprising a control device configured to control rotation of the rotating body and imaging performed by the camera, wherein the control device is configured to control the camera each time the rotating body is rotated by a predetermined angle to acquire an optical image of the outer peripheral surface of the terminal.

(5) The appearance inspection apparatus for a terminal according to (4), wherein the control device is configured to control the rotating body and the camera to acquire a projection image of the terminal inserted into the rotating body over a predetermined angle range, and to set an imaged position where a height of the terminal is the lowest in the projection image as a reference position and to start inspecting an appearance of the terminal.

According to the appearance inspection apparatus for a terminal that has the configuration (1), the optical image transmission unit in which the light entering end faces the outer peripheral surface of the terminal is rotated, so that it is possible to image the optical image of the outer peripheral surface of the terminal by the one fixed camera over the entire circumference. The rotation may not be stopped at a time of imaging the optical image of the outer peripheral surface of the terminal, so that it is possible to quickly image the optical image of the outer peripheral surface of the terminal at any position in the circumferential direction without being restricted by the angle. Therefore, it is possible to set an imaging part according to the product number of the terminal, and to reliably inspect the appearance of a part where a defect is likely to occur depending on the product number.

According to the appearance inspection apparatus for a terminal that has the configuration (2), it is possible to image the optical image of the outer peripheral surface of the terminal with the camera only using the reflection of the mirrors provided as elements of the optical image transmission unit. Therefore, a structure is simple and cost can be reduced.

According to the appearance inspection apparatus for a terminal that has the configuration (3), it is possible to easily and reliably attach and hold the mirrors provided as the elements of the optical image transmission unit. Therefore, the structure is simple and easy to be assembled, and the cost can be reduced.

According to the appearance inspection apparatus for a terminal that has the configuration (4), the control device controls the rotating body and the camera in conjunction with each other, so that it is possible to automatically acquire the optical image of the outer peripheral surface of the terminal that has been imaged from a desired angle.

According to the appearance inspection apparatus for a terminal that has the configuration (5), even when the terminal to be inspected has been inserted into the rotating body in an inclined state, it is possible to image and acquire the optical image at the desired angle in which an angle of the inclination of the terminal has been corrected.

Advantageous Effects of Invention

According to the appearance inspection apparatus for a terminal in the present invention, it is possible to image an outer peripheral surface of a terminal from any angle in a circumferential direction with one camera without rotating the camera, thereby simplifying a structure and reducing cost.

The present invention is briefly described as above. Details of the present invention will be further clarified by reading a mode (hereinafter, referred to as an "embodiment") for carrying out the present invention described below with reference to the accompanying drawings.

BRIEF DESCRIPTION OF THE DRAWINGS

FIGS. 5A and 5B are configuration views of a rotating body of the appearance inspection apparatus, in which FIG. 5A is an external perspective view, and FIG. 5B is a perspective view illustrating a state in which one side plate has been removed.

DETAILED DESCRIPTION OF EMBODIMENTS

A specific embodiment according to the present invention will be described with reference to drawings.

Figure 1:
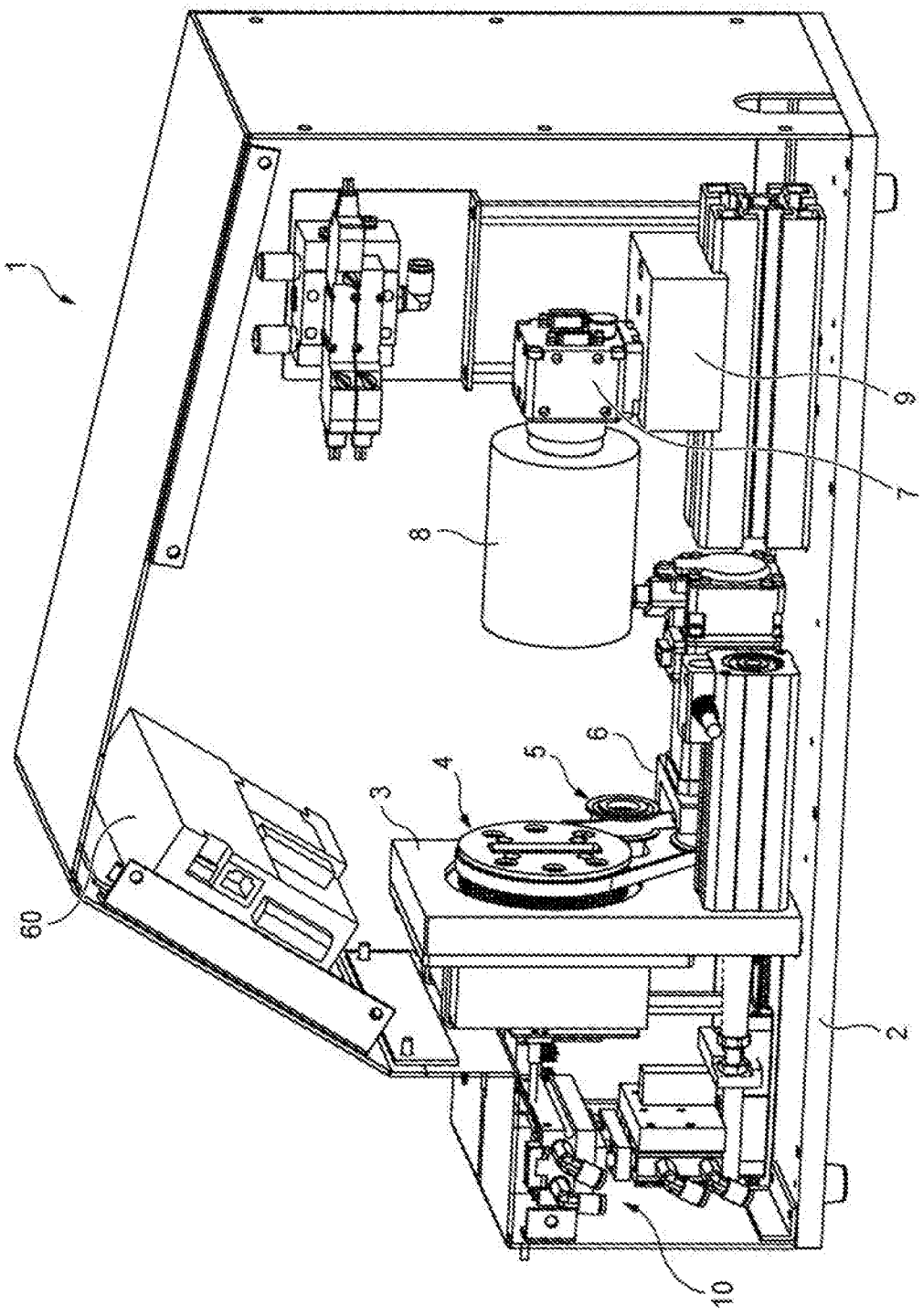
FIG. 1 is a perspective view illustrating an overall outline of an appearance inspection apparatus for a terminal according to an embodiment of the present invention.
Figure 2:
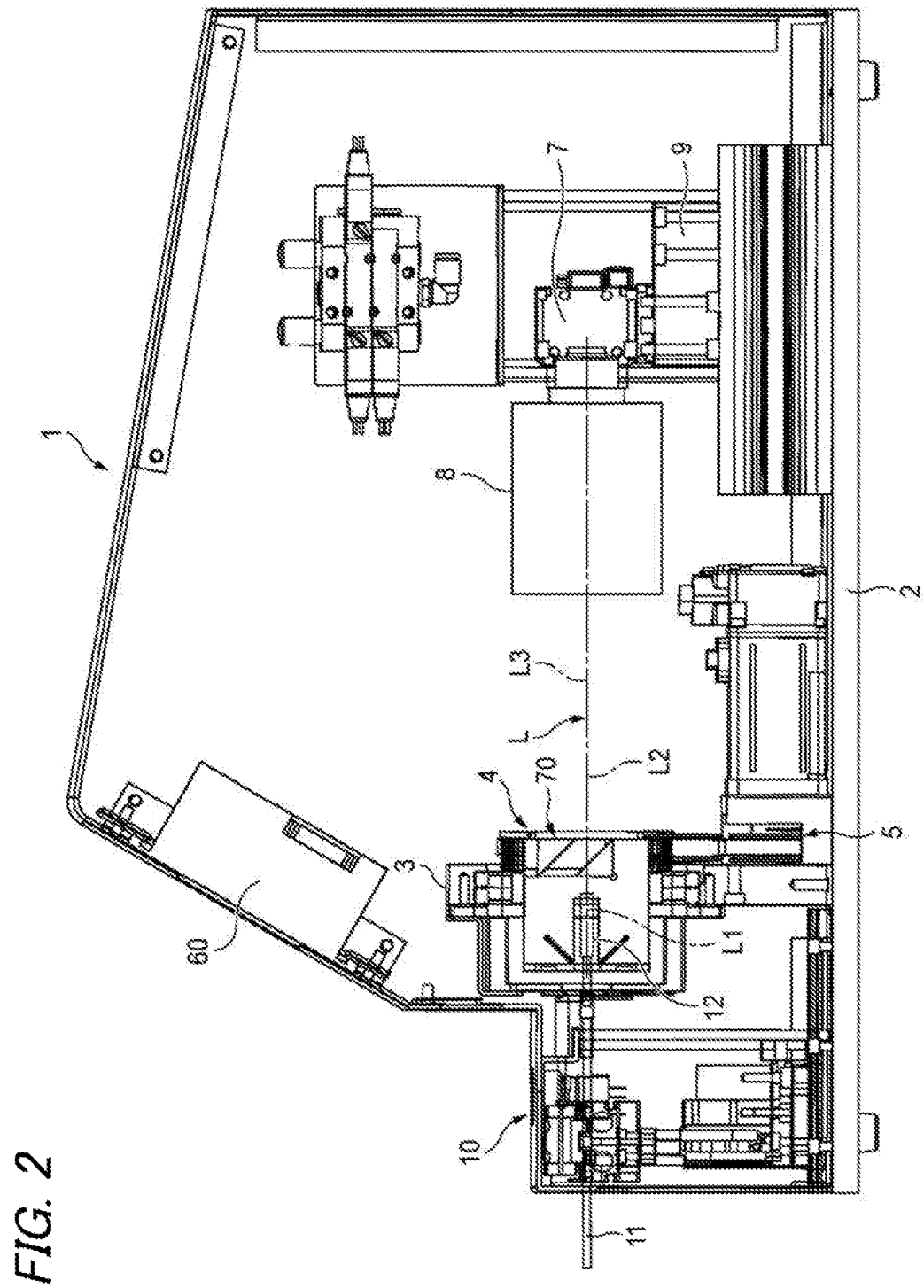
FIG. 2 is an overall sectional view of the appearance inspection apparatus.
Figure 3:
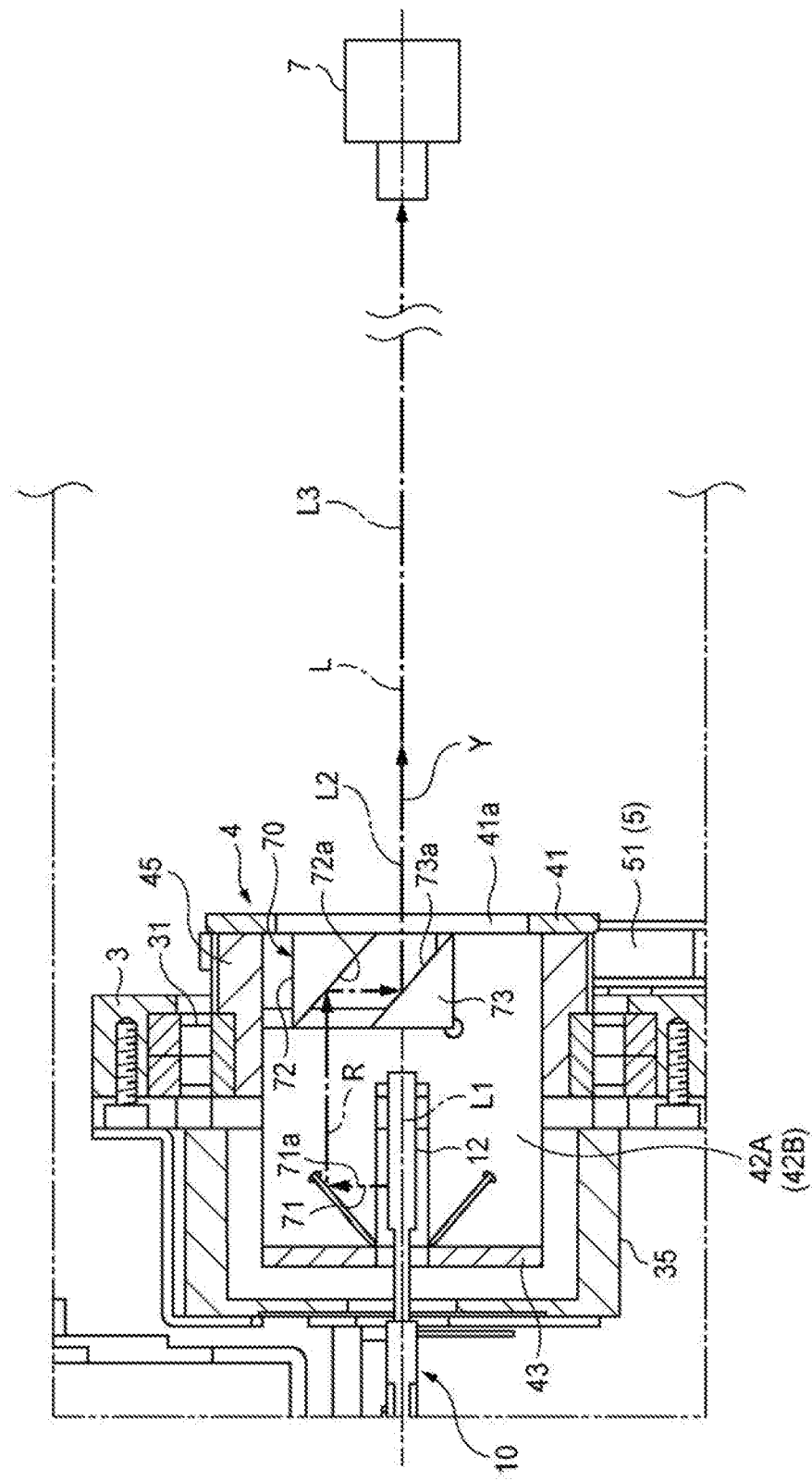
FIG. 3 is a sectional view of a main part of the appearance inspection apparatus.
Figure 4:
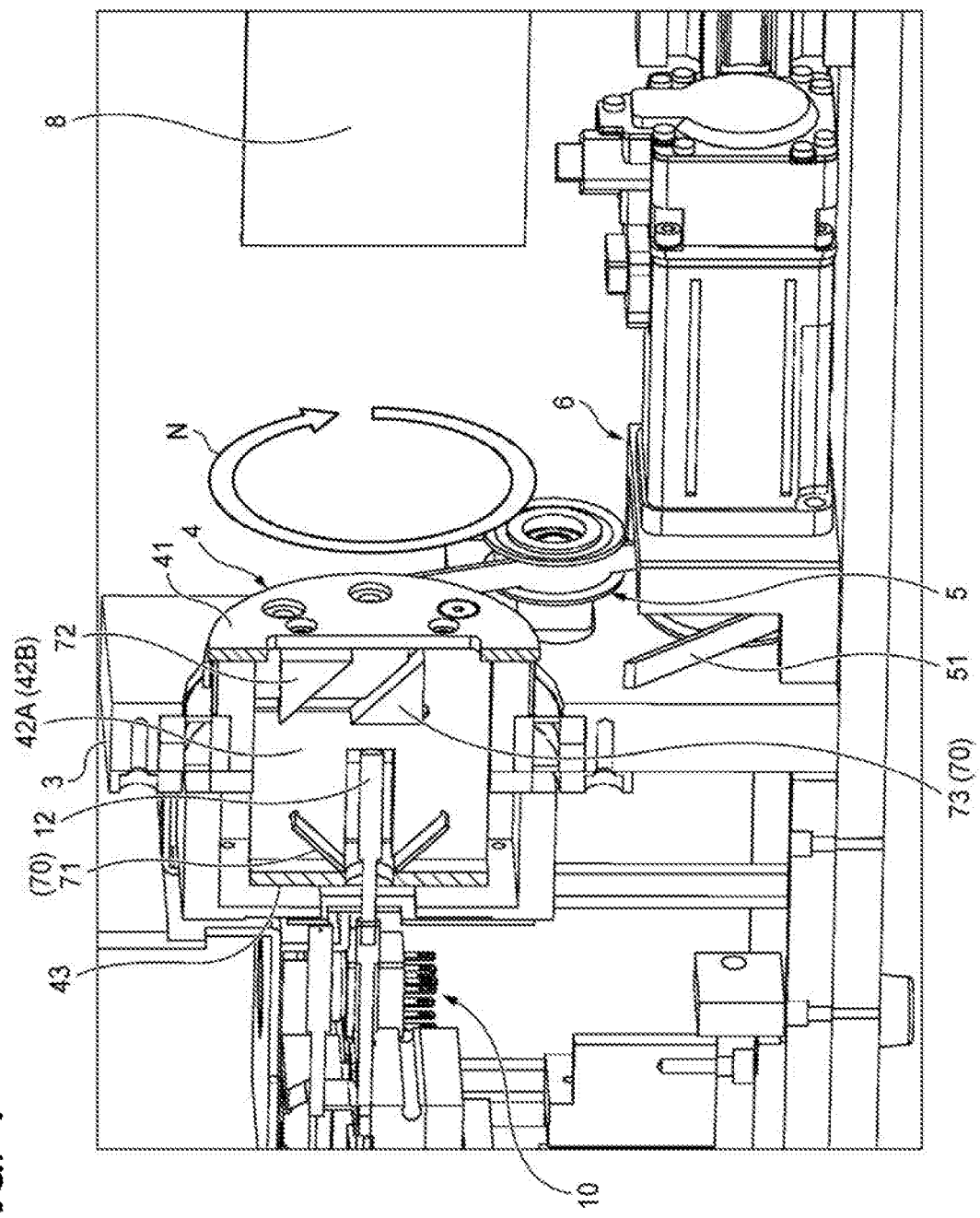
FIG. 4 is a perspective sectional view of the main part of the appearance inspection apparatus.

FIG. 1 is a perspective view illustrating an overall outline of an appearance inspection apparatus for a terminal according to the embodiment of the present invention. FIG. 2 is an overall sectional view. FIG. 3 is a sectional view of a main part. FIG. 4 is a perspective sectional view of the main part.

As illustrated in FIGS. 1 to 4, an appearance inspection apparatus 1 according to the present embodiment is configured to inspect an appearance of a part (a crimped part or the like) to be inspected of a terminal 12 that is crimped to an end of an electric wire 11 by imaging the part to be inspected with a camera 7. The appearance inspection apparatus 1 includes a fixed frame 3 erected on a base plate 2, a rotating body 4 rotatably supported on the fixed frame 3 via a bearing 31, a rotation transmission mechanism 5 configured to transmit a rotation force to the rotating body 4 using a belt 51, a motor 6 configured to drive the rotating body 4 via the rotation transmission mechanism 5, a camera 7 which is an imaging unit, a lens 8 provided in front of the camera 7, an optical image transmission unit 70 provided in the rotating body 4, and a terminal supporting unit 10 configured to support the terminal 12 to be inspected.

As illustrated in FIGS. 2 and 3, in the appearance inspection apparatus 1, a common axis L is set substantially horizontally. The rotating body 4 is provided so as to rotate about a rotation axis L2 set on the common axis L as indicated by an arrow N in FIG. 4. The terminal supporting unit 10 supports the terminal 12 inserted into the rotating body 4 in a non-rotational state in which an entire outer periphery of the part to be inspected is opened, and supports the terminal 12 in a state in which a central axis L1 of the terminal 12 is aligned with the common axis L at this time.

The camera 7 is provided at a position away from the rotating body 4, and is mounted and fixed on a camera base 9 in a state in which a light receiving axis L3 is aligned with the common axis L. The optical image transmission unit 70 is provided inside the rotating body 4 so as to rotate integrally with the rotating body 4, and includes a light entering mirror 71 corresponding to a light entering end, a light emitting mirror 73 corresponding to a light emitting end, and one or more intermediate mirrors 72.

The light entering mirror 71 is provided such that the reflection surface 71a faces an outer peripheral surface of the terminal 12 supported by the terminal supporting unit 10. Specifically, the light incident mirror 71 is provided at an inclination of 45° with respect to the rotation axis 12, and reflects an optical image of the outer peripheral surface of the terminal 12 toward the camera 7 in parallel with the common axis L.

The intermediate mirror 72 and the light emitting mirror 73 are each formed of a prism. The intermediate mirror 72 is provided away from the rotation axis L2, and a reflection surface 72a of the intermediate mirror 72 receives reflected light from the light entering mirror 71 and reflects the reflected light toward the common axis L. The light emitting mirror 73 is provided on the light receiving axis L3 of the camera 7, that is, on the common axis L. A reflection surface 73a of the light emitting mirror 73 receives the reflected light from the intermediate mirror 72 and reflects the reflected light toward the camera 7 through the lens 8.

That is, the light entering mirror 71, the light emitting mirror 73, and the intermediate mirror 72 are provided in such a relationship that the optical image of the outer peripheral surface of the terminal 12 that has entered the light entering mirror 71 is emitted from the light emitting mirror 73 toward the camera 7 via the intermediate mirror 72 (this is referred to as a "transmission condition"). Orientation and arrangement of the light entering mirror 71, the light emitting mirror 73, and the intermediate mirror 72 can be set freely as long as the above-described transmission condition is satisfied. Instead of using a mirror or the prism, another type of transmission material which is an optical fiber or the like can be used to store the optical image of the outer peripheral surface of the terminal in the camera 7.

Figure 5A:
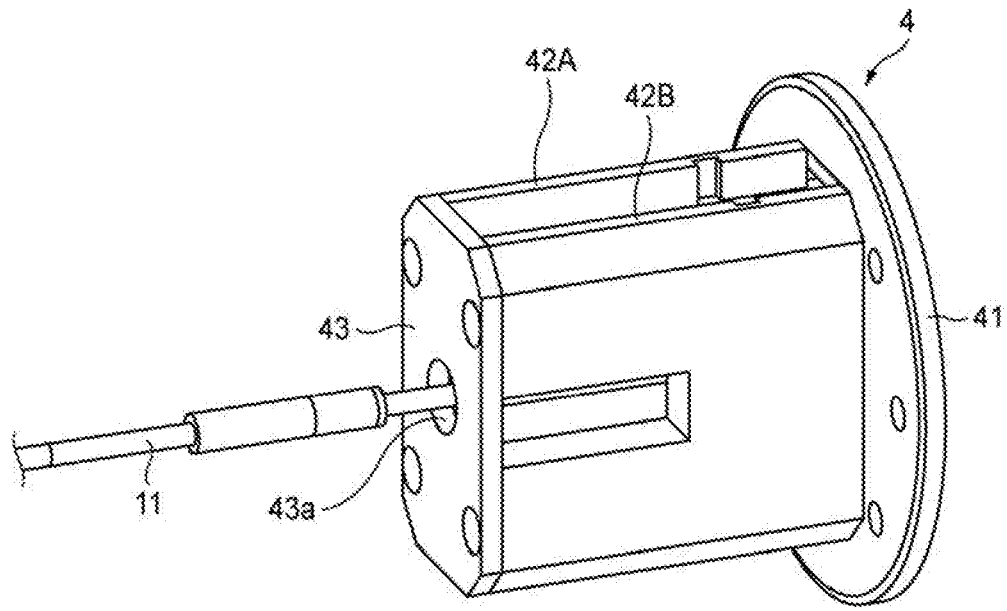
Figure 5B:
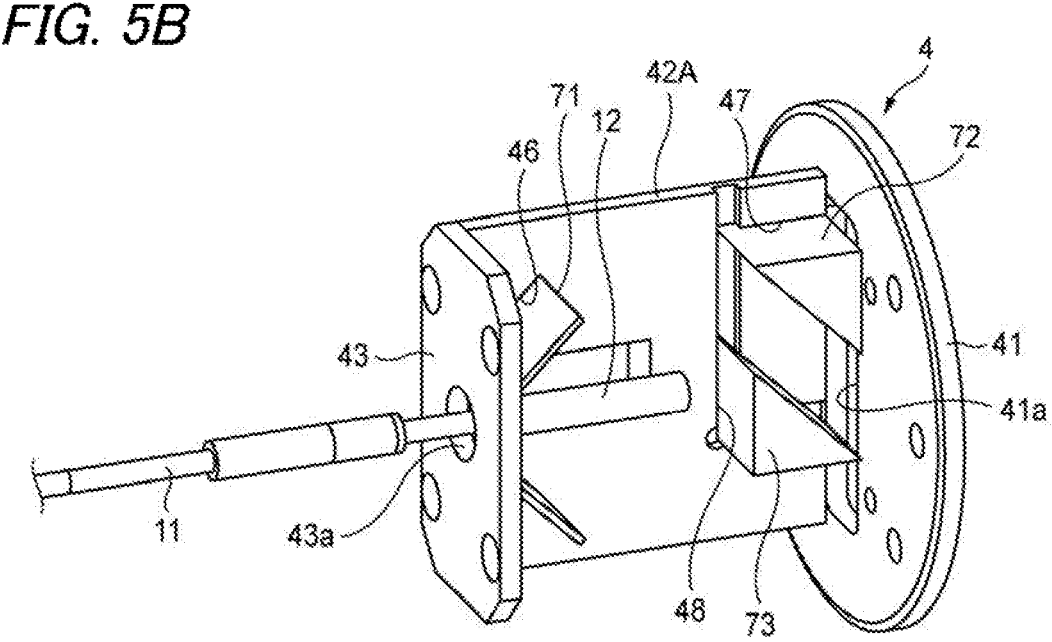

FIGS. 5A and 5B are configuration views of the rotating body 4 of the appearance inspection apparatus 1, in which FIG. 5A is an external perspective view, and FIG. 5B is a perspective view illustrating a state in which one side plate has been removed.

As illustrated in FIGS. 5A and 58, the rotating body 4 includes a circular end face plate 41 provided at one end of the rotating body 4 in an axial direction, a rectangular end face plate 43 provided at the other end of the rotating body 4 in the axial direction, and a pair of side plates 42A. 42B that are provided between the circular end face plate 41 and the rectangular end face plate 43 and integrally connect the two end face plates 41, 43. The pair of side plates 42A, 42B include inner side surfaces parallel to the rotation axis L2 of the rotating body 4, and include, on each inner surface, optical element supporting grooves 46, 47, 48 configured to support the light entering mirror 71, the intermediate mirror 72, and the light emitting mirror 73. The light entering mirror 71, the intermediate mirror 72, and the light emitting mirror 73 are sandwiched between the pair of side plates 42A, 42B in a state of being positioned between the pair of side plates 42A, 42B by fitting both side edges of each of the light entering mirror 71, the intermediate mirror 72, and the light emitting mirror 73 into the optical element supporting grooves 46, 47, 48 on the inner side surfaces of the pair of side plates 42A. 42B.

The circular end faceplate 41 on a camera 7 side is provided with a slit 41a for sending the reflected light from the light emitting mirror 73 toward the camera 7. At a center of the rectangular end face plate 43 on an insertion side of the terminal 12, an insertion hole 43a for inserting the terminal 12 into the rotating body 4 is provided.

As illustrated in FIG. 3, a frame body 45 including winding teeth of the belt 51 on an outer peripheral cylindrical portion thereof is fitted and fixed to an outer periphery of the rotating body 4, and the frame body 45 is fitted to the bearing 31, so that the rotating body 4 is rotatably supported in the fixed frame 3. The terminal insertion side of the rotating body 4 is covered with a cover 35 attached to the fixed frame 3, and the rotating body 4 is rotated in the cover 35.

Next, an operation will be described.

When the appearance inspection of the terminal 12 is performed using the appearance inspection apparatus 1, the terminal 12 crimped to the end of the electric wire 11 is inserted into the rotating body 4 using the terminal supporting unit 10, and is positioned and held at a predetermined inspection position. In this state, the rotating body 4 is rotated, and the optical image of the outer peripheral surface of the terminal 12 is imaged by the camera 7 at any angular position within 360° of one circumference. That is, the optical image of the outer peripheral surface of the terminal 12 is reflected by the light entering mirror 71 toward the intermediate mirror 72, is reflected from the intermediate mirror 72 toward the light emitting mirror 73, enters the camera 7 from the light emitting mirror 73 via the lens 8, and is acquired as image data. A thick arrow Y in FIG. 3 indicates a transmission path of the optical image.

For example, the optical image of the outer peripheral surface of the terminal 12 is acquired by the camera 7 at an angular position in increments of 22.5° obtained by dividing 360° into 16 parts. It is possible to set the number of divisions freely, and to set the number of divisions to a coarser division number (for example, 8 divisions) or a finer division number (for example, 32 divisions). It is also possible to set a position to be imaged freely regardless of the number of divisions.

In terms of determination of the imaging angular position and the acquisition of the optical image at the position, for example, a control device (not illustrated) configured to control driving of the entire appearance inspection apparatus 1 inputs a rotation angle of the rotating body 4 calculated by a control device of the motor 6 and when the rotating body 4 is rotated to the rotation angle set in advance, the control device controls the camera 7 to capture the optical image into the camera 7. Alternatively, a rotation sensor configured to detect the rotation angle of the rotating body 4 is provided separately at a preset rotation angle, and the control device captures the optical image of the outer peripheral surface of the terminal into the camera 7 according to a detection signal thereof.

As described above, according to the appearance inspection apparatus 1 in the present embodiment, the optical image transmission unit 70 in which the light entering end (the light entering mirror) 71 faces the outer peripheral surface of the terminal 12 is rotated, so that it is possible to image the optical image of the outer peripheral surface of the terminal 12 by the one fixed camera 7 over the entire circumference of the terminal 12 in the circumferential direction. It is not necessary stop the rotation of the rotating body 4 at a time of imaging the optical image of the outer peripheral surface of the terminal 12, so that it is possible to quickly image the optical image of the outer peripheral surface of the terminal 12 at any position in the circumferential direction without being restricted by the angle. Therefore, it is possible to set an imaging part according to the product number of the terminal 12, and to reliably inspect the appearance of a part where a defect is likely to occur depending on the product number.

The image acquired by the camera 7 is compared with an image obtained by imaging a normal product in advance using a microcomputer or the like in the control device to determine whether the product is non-defective or defective. These comparisons and determinations can be performed automatically by the microcomputer performing image processing. When the appearance inspection apparatus 1 is used as a single desktop machine, for example, it is possible to display the acquired image or a determination result on a display 60 illustrated in FIGS. 1 and 2.

In order to improve an imaging condition, it is preferable to illuminate a subject (the part to be inspected of the terminal) with a lighting device (not illustrated). A background member for further clearing the optical image of the subject may be provided on a side opposite to the light entering mirror 71 with the terminal 12 which is the subject interposed therebetween.

Inspection items for determining a non-defective product and a defective product include, in a case of a crimped part of a general electric wire, "whether there is an abnormality in core wire pull-in", "whether there is an abnormality in coating bite", "whether there is a peeling abnormality", "whether there is an abnormality in core wire fraying", "whether there is a bell-mouth abnormality", "whether there is an abnormality in back burr (from which wear of a tooth profile of the crimping device can be seen)", and "whether there is an abnormality in anvil damage". In a case of a coaxial electric wire, the inspection items for determining a non-defective product and a defective product further include "whether there is an abnormality in braid folding", "whether there is an abnormality in aluminum foil fraying", and "whether there is an insulator remaining abnormality" in addition to the items in the case of the general electric wire.

According to the appearance inspection apparatus 1 in the embodiment, it is possible to image the optical image of the outer peripheral surface of the terminal 12 with the camera 7 only using the reflection of the mirrors (the light entering mirror 71, the intermediate mirror 72, and the light emitting mirror 73) provided as elements of the optical image transmission unit 70. Therefore, a structure is simple and cost can be reduced.

According to the appearance inspection apparatus 1 in the present embodiment, the mirrors are held by fitting both side edges of each of the light entering mirror 71, the intermediate mirror 72, and the light emitting mirror 73 into the optical element supporting grooves 46, 47, 48 of the pair of side plates 42A, 42B which are components of the rotating body 4, so that the mirrors can be easily and reliably attached and held. Therefore, the structure is simple and easy to be assembled, and the cost can be reduced.

Next, an example in which the appearance inspection apparatus is incorporated in a series of steps of crimping a terminal fitting to the coaxial electric wire will be briefly described.

Figure 6:
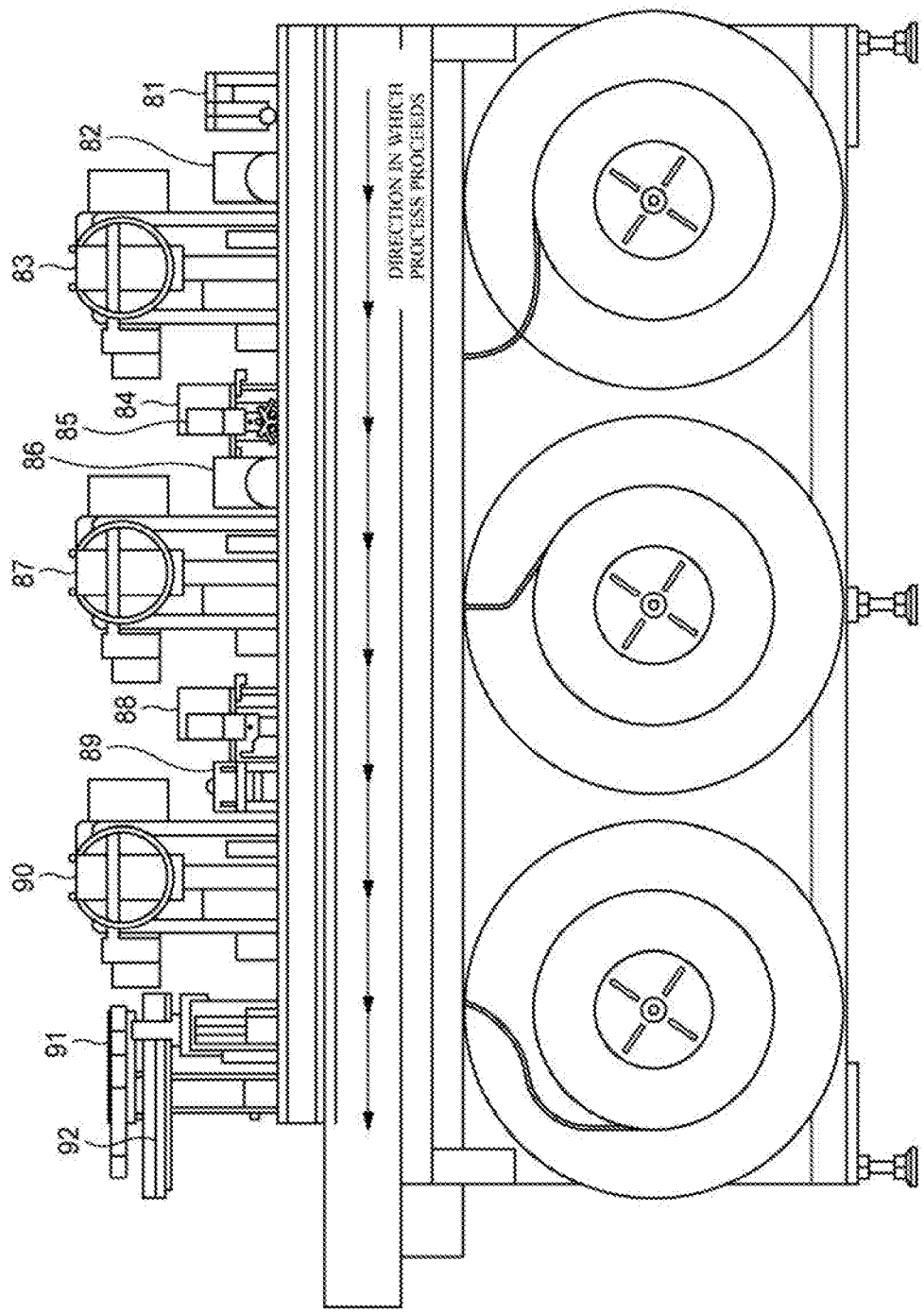
FIG. 6 is an overall schematic view of a terminal crimping line including the appearance inspection apparatus according to the embodiment of the present invention.

FIG. 6 is an overall schematic view of a terminal crimping line including the appearance inspection apparatus according to the present embodiment.

In this manufacturing line, a process proceeds from a right end to a left end of FIG. 6, the electric wire and the terminal are provided with axes thereof oriented in a direction orthogonal to the drawing, are held by a chuck, and are sequentially set in an apparatus configured to sequentially perform operation content in each step. The appearance inspection apparatuses are provided at a plurality of positions in the series of steps.

When the terminal crimping line is described in order of the steps, an electric wire setting mechanism 81 is provided at a most upstream position. Next, in the following order, a first peeling mechanism 82, a first crimping mechanism 83, a camera mechanism 84, a braid reversing mechanism 85, a second peeling mechanism 86, a second crimping mechanism 87, a braid unraveling mechanism 88, a first camera 360° mechanism (the appearance inspection apparatus according to the present embodiment) 89, a third crimping mechanism 90, a second camera 360° mechanism (the appearance inspection apparatus according to the present embodiment) 91, and a releasing mechanism 92 are provided.

As described above, when the appearance inspection apparatus according to the present embodiment is used in the terminal crimping line, that is, in an in-line state, a display configured to set operation of each mechanism or display status is usually provided in an apparatus configured to control the entire terminal crimping line, so that the display 60 illustrated in FIGS. 1 and 2 can be omitted.

Figure 7:
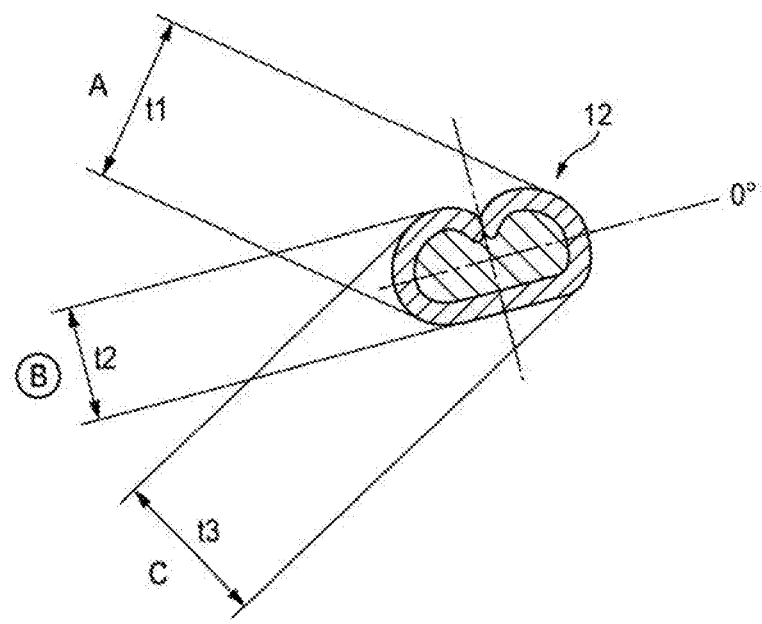
FIG. 7 illustrates a method for obtaining an angular position of an inspection reference when the terminal to be inserted and set is inclined in the appearance inspection apparatus.

When them is a variation (a variation in the rotation direction around the central axis L1 of the terminal) in an insertion angle of the terminal 12 with respect to the inside of the rotating body 4, it is necessary to set a reference position at the time of imaging the terminal 12. For example, as illustrated in FIG. 7, when the crimped part of the terminal 12 is set to the inspection position, a projection image of the terminal 12 is first acquired over a predetermined angle before the optical image for the appearance inspection is acquired. Then, an imaging position where a height (a thickness) of the projection image is the smallest is set as the reference position.

For example, when the height of the projection image is t1 at a position A, t2 at a position B, t3 is at a position c, and when t2 is the minimum, the position B where the thickness is minimum is set as the reference position (0°), and the subsequent appearance inspection image is acquired.

Here, characteristics of the above-described appearance inspection apparatus for a terminal according to the embodiment of the present invention are summarized briefly in the following [1] to [5], respectively.

[1] An appearance inspection apparatus (1) for a terminal (12) crimped to an end of an electric wire (I), the appearance inspection apparatus (1) including:

a rotating body (4) configured to rotate about a rotation axis (L2);

a terminal supporting unit (10) configured to support the terminal (12) inserted into the rotating body (4) in a state in which an entire outer periphery of a part to be inspected is opened and a central axis (L1) of the terminal (12) is aligned with the rotation axis (L2);

a camera (7) provided in a state in which a light receiving axis (L3) is aligned with the rotation axis (L2); and an optical image transmission unit (70) that is provided in the rotating body (4) so as to rotate integrally with the rotating body (4), that is provided such that a light entering end (71) faces an outer peripheral surface of the terminal (12) supported on the terminal supporting unit (10) and a light emitting end (73) is provided on the light receiving axis (L3) of the camera (7), and that is configured to emit an optical image of the outer peripheral surface of the terminal (12) having entered the light entering end (71) from the light emitting end (73) toward the camera (7).

[2] The appearance inspection apparatus (1) for a terminal according to [1], in which the optical image transmission unit (70) includes:

a light entering mirror (71) provided at the light entering end;

a light emitting mirror (73) provided at the light emitting end; and one or more intermediate mirrors (72) configured to transmit an optical image of the outer peripheral surface of the terminal (12) that has entered the light entering mirror (71) and has been reflected by the light entering mirror (71) to the light emitting mirror (73) by reflection, and to emit the optical image from the light emitting mirror (73) toward the camera (7).

[3] The appearance inspection apparatus (1) for a terminal according to [2], in which the rotating body (4) includes a pair of side plates (42A, 42B) including inner side surfaces in parallel with the rotation axis (L2) and optical element supporting grooves (46, 47, 48) on each inner side surface, and in which the light entering mirror (71), the light emitting mirror (73), and the intermediate mirror (72) are sandwiched between the pair of side plates (42A, 42B) by fitting both side edges of each of the light entering mirror (71), the light emitting mirror (73), and the intermediate mirror (72) into the optical element supporting grooves (46, 47, 48) of the inner side surfaces of the pair of side plates (42A, 42B).

[4] The appearance inspection apparatus for a terminal according to [1], the appearance inspection apparatus further including a control device configured to control rotation of the rotating body (4) and imaging performed by the camera (7), in which the control device is configured to control the camera (7) each time the rotating body (4) is rotated by a predetermined angle to acquire an optical image of the outer peripheral surface of the terminal (12).

[5] The appearance inspection apparatus for a terminal according to [4], in which the control device is configured to control the rotating body (4) and the camera (7) to acquire a projection image of the terminal (12) inserted into the rotating body (4) over a predetermined angle range, and to set an imaged position where a height of the terminal (12) is the lowest in the projection image as a reference position and to start inspecting an appearance of the terminal (12).

What is claimed is:

1. An appearance inspection apparatus for a terminal crimped to an end of an electric wire, the appearance inspection apparatus comprising:

a rotating body configured to rotate about a rotation axis;

a terminal supporting unit configured to support the terminal inserted into the rotating body in a non-rotational state in which an entire outer periphery of a part to be inspected is opened and in a state in which a central axis of the terminal is aligned with the rotation axis;

a camera, physically separated from the rotating body, provided in a state in which a light receiving axis is aligned with the rotation axis and the central axis of the terminal; and an optical image transmission unit that is provided in the rotating body so as to rotate integrally with the rotating body, that is provided such that a light entering end faces an outer peripheral surface of the terminal supported on the terminal supporting unit and a light emitting end is provided on the light receiving axis of the camera, and that is configured to emit an optical image of the outer peripheral surface of the terminal having entered the light entering end from the light emitting end toward the camera, wherein the rotating body is further configured to rotate while the camera and the terminal remain stationary, wherein the rotating body includes a pair of side plates extending in parallel with the rotation axis and sandwiching the optical image transmission unit therebetween, and wherein an outer periphery of the rotation body is formed with a bearing attachment portion to which a bearing for rotatably supporting the rotating body is attached, and formed with a belt attachment portion to which a belt for rotatably drive the rotating body is fitted, the bearing attachment portion and the belt attachment portion being positioned within an existence range of the side plates along the rotation axis.

2. The appearance inspection apparatus for a terminal according to claim 1, wherein the optical image transmission unit includes:

a light entering mirror provided at the light entering end;

a light emitting mirror provided at the light emitting end; and one or more intermediate mirrors configured to transmit an optical image of the outer peripheral surface of the terminal that has entered the light entering mirror and has been reflected by the light entering mirror to the light emitting mirror by reflection, and to emit the optical image from the light emitting mirror toward the camera.

3. The appearance inspection apparatus for a terminal according to claim 2, wherein the rotating body includes theft pair of side plates including inner side surfaces in parallel with the rotation axis and optical element supporting grooves on each inner side surface, and wherein the light entering mirror, the light emitting mirror, and the intermediate mirror are sandwiched between the pair of side plates by fitting both side edges of each of the light entering mirror, the light emitting mirror, and the intermediate mirror into the optical element supporting grooves of the inner side surfaces of the pair of side plates.

4. The appearance inspection apparatus for a terminal according to claim 1, the appearance inspection apparatus further comprising a control device configured to control rotation of the rotating body and imaging performed by the camera, wherein the control device is configured to control the camera each time the rotating body is rotated by a predetermined angle to acquire an optical image of the outer peripheral surface of the terminal.

5. The appearance inspection apparatus for a terminal according to claim 4, wherein the control device is configured to control the rotating body and the camera to acquire a projection image of the terminal inserted into the rotating body over a predetermined angle range, and to set an imaged position where a height of the terminal is the lowest in the projection image as a reference position and to start inspecting an appearance of the terminal.

* * * * *